United States Patent
Jiang et al.

(10) Patent No.: US 12,554,611 B2
(45) Date of Patent: Feb. 17, 2026

(54) METHOD AND SYSTEM FOR SYSTEM ON CHIP POWER CONSUMPTION ANALYSIS

(71) Applicant: SAMSUNG ELECTRONICS CO., LTD., Suwon-si (KR)

(72) Inventors: Chuncheng Jiang, Jiangsu (CN); Liang Zhang, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 18/434,937

(22) Filed: Feb. 7, 2024

(65) Prior Publication Data

US 2024/0320115 A1    Sep. 26, 2024

(30) Foreign Application Priority Data

Mar. 24, 2023   (CN) .......................... 202310301308.9

(51) Int. Cl.
  *G06F 11/30*   (2006.01)
  *G06F 1/28*    (2006.01)
  *G06F 15/78*   (2006.01)

(52) U.S. Cl.
  CPC ............ *G06F 11/3062* (2013.01); *G06F 1/28* (2013.01); *G06F 11/3013* (2013.01); *G06F 15/7807* (2013.01)

(58) Field of Classification Search
  None
  See application file for complete search history.

(56) References Cited

U.S. PATENT DOCUMENTS

| | | | |
|---|---|---|---|
| 8,230,270 B2 | 7/2012 | Pont et al. | |
| 8,453,086 B2 | 5/2013 | Tung et al. | |
| 9,124,738 B2 | 9/2015 | Matsumoto | |
| 9,778,721 B2 | 10/2017 | Zeng | |
| 10,996,733 B2 | 5/2021 | Lee et al. | |
| 11,106,563 B2 * | 8/2021 | Ajiro | G06F 11/07 |
| 11,215,651 B2 | 1/2022 | Sato et al. | |
| 2004/0186703 A1 | 9/2004 | Radjassamy | |
| 2008/0148180 A1 * | 6/2008 | Liu | G06F 11/3409 714/E11.002 |
| 2009/0282292 A1 * | 11/2009 | Squire | H04L 41/0631 714/39 |
| 2010/0083046 A1 * | 4/2010 | Tanaka | G06F 11/079 714/E11.029 |
| 2011/0060931 A1 * | 3/2011 | Radhakrishnan | G06F 1/3237 713/340 |
| 2016/0262108 A1 | 9/2016 | Weast et al. | |
| 2018/0239682 A1 * | 8/2018 | Kaluza | G06F 11/3006 |

* cited by examiner

*Primary Examiner* — Fahmida Rahman
(74) *Attorney, Agent, or Firm* — Morgan, Lewis & Bockius LLP

(57) ABSTRACT

A method for a system on chip (SoC) power consumption analysis, the method including: monitoring a plurality of key parameters of the SoC, wherein the plurality of key parameters are related to power consumption of the SoC; detecting an abnormal type of the SoC based on the plurality of key parameters; calling a profile corresponding to the detected abnormal type among a plurality of profiles; monitoring and collecting each of parameters in a parameter set included in the called profile to form a log; and performing power consumption-based analysis on the SoC based on the log.

20 Claims, 5 Drawing Sheets

METHOD AND SYSTEM FOR SYSTEM ON CHIP POWER CONSUMPTION ANALYSIS

CROSS-REFERENCE TO RELATED APPLICATION

This application claims priority under 35 U.S.C. § 119 to Chinese Patent Application No. 202310301308.9, filed on Mar. 24, 2023, in the Chinese Patent Office, the disclosure of which is incorporated by reference herein in its entirety.

TECHNICAL FIELD

The present disclosure relates to power consumption analysis of an electronic device, and more particularly to a method and a system for System on Chip power consumption analysis.

DISCUSSION OF RELATED ART

With the rapid development of integrated circuits, a SoC (System on Chip) has been widely used. The SoC is an integrated circuit that integrates most or all components of a computer or other electronic system. The SoC has characteristics such as low power consumption, long standby time, long service life and wide application.

Power analysis is a tool used to evaluate the SoC. Traditional power analysis methods may lead to inaccurate results due to various reasons. Therefore, a technology that can accurately analyze the power consumption of the SoC is needed.

SUMMARY

According to example embodiments of the present disclosure, there is provided a method for a system on chip (SoC) power consumption analysis, the method including: monitoring a plurality of key parameters of the SoC, wherein the plurality of key parameters are related to power consumption of the SoC; detecting an abnormal type of the SoC based on the plurality of key parameters; calling a profile corresponding to the detected abnormal type among a plurality of profiles; monitoring and collecting each of parameters in a parameter set included in the called profile to form a log; and performing power consumption-based analysis on the SoC based on the log.

According to example embodiments of the present disclosure, there is provided a system for a SoC power consumption analysis, the system including: a processor configured to: monitoring a plurality of key parameters of the SoC, wherein the plurality of key parameters are related to the power consumption of the SoC; detecting an abnormal type of the SoC based on the plurality of key parameters; calling a profile corresponding to the detected abnormal type among a plurality of profiles; monitoring and collecting each of parameters in a parameter set included in the called profile to form a log; and performing power consumption-based analysis on the SoC based on the log.

BRIEF DESCRIPTION OF THE DRAWINGS

The above and other features of the present disclosure will become more apparent through the following detailed description together with the accompanying drawings in which.

DETAILED DESCRIPTION OF THE EMBODIMENTS

Figure 1:
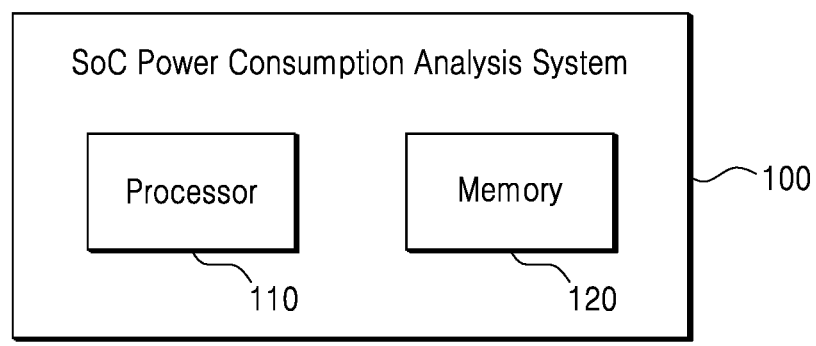
FIG. 1 is a diagram illustrating a system for SoC power consumption analysis according to some example embodiments of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of the present application. For example, the sequences of operations described herein are examples, and are not limited to those set forth herein, but may be changed as will be apparent after an understanding of disclosure of the present application, unless the context clearly indicates otherwise. In addition, descriptions of features that are known in the art may be omitted for increased clarity and conciseness.

The features described herein may be embodied in different forms, and are not to be construed as being limited to the examples described herein. Rather, the examples described herein have been provided to illustrate some of the many possible ways of implementing the methods, apparatuses, and/or systems described herein that will be apparent after an understanding of the disclosure of the present application.

The following structural or functional descriptions of examples disclosed herein are intended for the purpose of describing the examples and the examples may be implemented in various forms. The examples are not meant to be limited, but it is intended that various modifications, equivalents, and alternatives are also covered within the scope of the claims.

Although terms of "first" or "second" may be used to explain various components, the components are not limited to the terms. These terms should be used to distinguish one component from another component. For example, a "first" component may be referred to as a "second" component, or similarly, and the "second" component may be referred to as the "first" component.

It will be understood that when a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising", when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms including technical or scientific terms used herein have the same or similar meaning as commonly understood by one of ordinary skill in the art to which the examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements (or similar elements) will be designated by the same reference numerals (or similar reference numerals), and redundant descriptions thereof will be omitted.

Embodiments of the present disclosure may be described and illustrated in terms of blocks which carry out a described function or functions. These blocks, which may be referred to herein as units or modules or the like, may be physically implemented by analog and/or digital circuits such as logic gates, integrated circuits, microprocessors, microcontrollers, memory circuits, passive electronic components, active electronic components, optical components, hardwired circuits, or the like, and may be driven by firmware and/or software. The circuits may, for example, be embodied in one or more semiconductor chips, or on substrate supports such as printed circuit boards and the like. Circuits constituting the blocks may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

FIG. 1 is a diagram illustrating a system for SoC power consumption analysis according to some example embodiments of the present disclosure.

In an example embodiment, an electronic device may include a SoC (System on Chip), and the SoC may include a system for SoC power analysis (e.g., a SoC power consumption analysis system 100). Electronic devices according to various example embodiments of the present disclosure may include for example mobile phones, tablet personal computers (PC), personal digital assistants (PDA) and the like. However the present disclosure is not limited thereto, and the electronic device according to the present disclosure may be any device having the SoC.

Referring to FIG. 1, the SoC may be a technology-intensive semiconductor with an entire system contained in a single chip. In other words, the SoC may be a single chip implemented by a system including devices having several functions. By integrating devices having several functions in a single chip, a product may be miniaturized, and manufacturing costs may be reduced compared to a case where semiconductors having respective functions are individually manufactured.

As shown in FIG. 1, the SoC power consumption analysis system 100 may include a processor 110 and a memory 120. In an example embodiment, the processor 110 may control all operations of the SoC power consumption analysis system 100, and more specifically may control operations of other components included in the SoC power consumption analysis system 100. The processor 110 may be implemented as for example a general purpose processor, a special purpose processor or an application processor or the like.

In an example embodiment, the SoC power consumption analysis system 100 may operate independently on the electronic device.

The memory 120 may include volatile memory (such as, Dynamic Random Access Memory (DRAM), Static Random Access Memory (SRAM), Thyristor RAM (T-RAM), Zero Capacitor RAM (Z-RAM) and Dual Transistor RAM (TTRAM), etc.) and/or non-volatile memory (such as, Electrically erasable programmable read-only memory (EEPROM), flash memory, magnetic RAM (MRAM), spin transfer torque (STT)-MRAM, conductive bridge RAM (CBRAM), ferroelectric RAM (FeRAM), phase change RAM (PRAM), resistive RAM (RRAM), nanotube RRAM, polymer RAM (PoRAM), nano floating gate memory (NFGM), holographic memory, a molecular electronic memory device and insulation resistance change memory, etc.). The memory 120 may store various data generated and used by the SoC power consumption analysis system 100.

Figure 2:
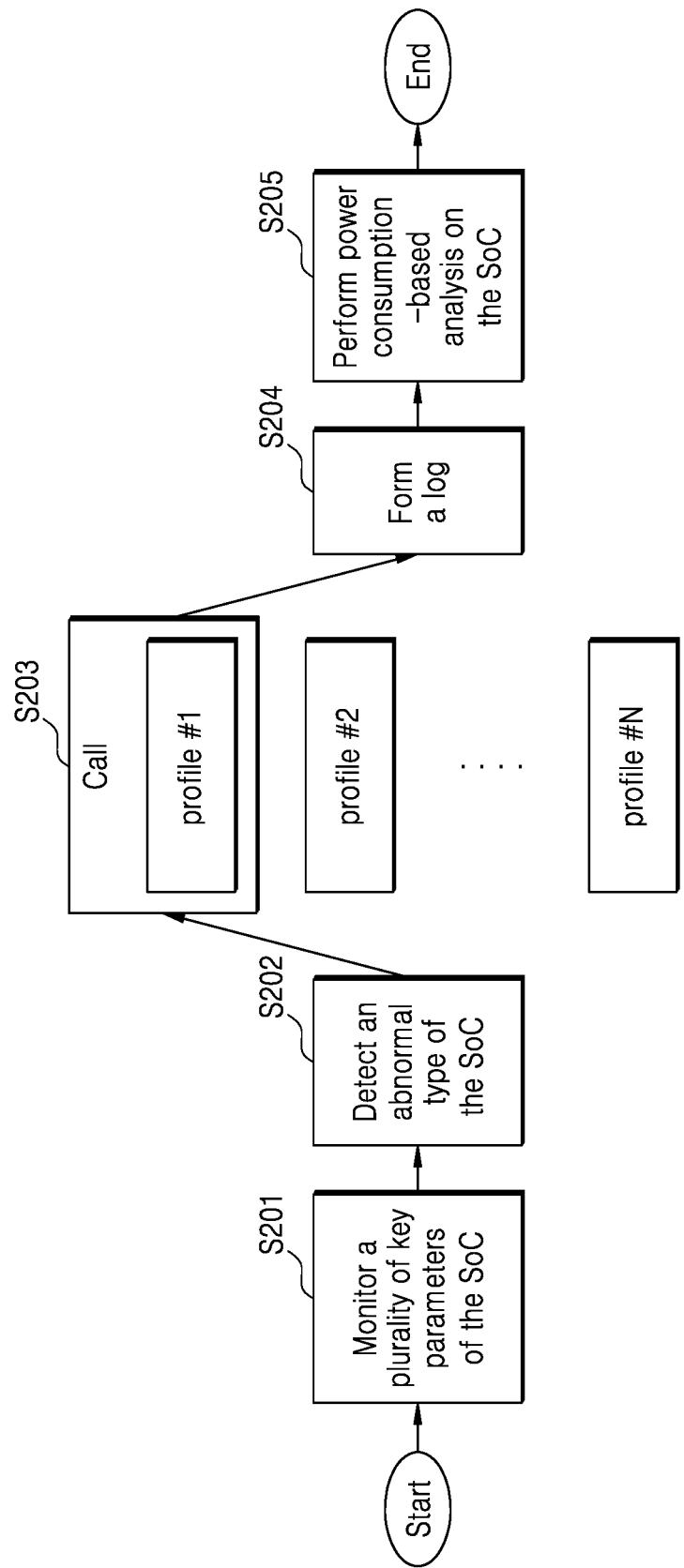
FIG. 2 is a diagram illustrating an example for describing SoC power consumption analysis according to some example embodiments of the present disclosure.

FIG. 2 is a diagram illustrating an example for describing SoC power consumption analysis according to some example embodiments.

Referring to FIGS. 1 and 2, the processor 110 of the SoC power consumption analysis system 100 may monitor a plurality of key parameters of the SoC, and the key parameters of the SoC are parameters related to the power consumption of the SoC (S201). For example, the key parameters of the SoC may be parameters related to increasing power consumption due to an abnormality of the SoC.

In an example embodiment, the SoC power consumption analysis system 100 may monitor the plurality of key parameters of the SoC at a predetermined frequency. For example, the SoC power consumption analysis system 100 may monitor the plurality of key parameters of the SoC at preset times.

In an example embodiment, the plurality of key parameters of the SoC may include at least two of channel information, memory interface (MIF) information, cell handover information, radio access (RAT) registration information, Shannon Interface for Telephony (SIT) message information, and SoC sleep information, and the key parameters are not limited thereto.

In an example embodiment, the channel information may include at least one of application data, log data, non-volatile (NV) data and interface control data, and the channel information is not limited thereto.

In an example embodiment, the MIF information may include at least one of a number of times and a duration of the MIF connection, and the MIF information is not limited thereto.

In an example embodiment, the cell handover information may include at least one of a number of times of cell switching, a number of times and a duration of a radio resource control (RRC) SETUP, and the cell handover information is not limited thereto.

In an example embodiment, the RAT registration information may include at least one of a number of times of RAT switching and a change in the registration status, and the RAT registration information is not limited thereto.

In an example embodiment, the SIT message information may comprise a number of SIT messages, and the SIT messages may contain a request and indication message between an application processor (AP) and a communication processor (CP), and the SIT message information is not limited thereto.

In an example embodiment, the SoC sleep information may include at least one of a paging interval, on and off time of the SoC when the RRC is connected, and the SoC sleep information is not limited thereto.

However, examples of key parameters are not limited thereto, and in some other embodiments, the key parameters may be parameters related to the performance of the SoC.

In an example embodiment, the key parameters may be stored in the memory 120.

Referring to FIGS. 1 and 2, the processor 110 may detect an abnormal type of the SoC (e.g., an abnormal scenario, an abnormal condition) based on the plurality of key parameters, after monitoring the plurality of key parameters of the SoC (S202).

The abnormal type of the SoC may be a type of abnormality that is determined based on an abnormality of a single key parameter or an abnormality of a key parameter set including a plurality of key parameters. Here, each key parameter set may include two or more key parameters, and different key parameter sets may include different combinations of key parameters, or the same combination of key parameters with different abnormal judgment conditions (e.g., normal ranges and/or abnormal ranges). In this case, each abnormal type may correspond to a single key parameter or a single set of key parameters.

In an example embodiment, it is indicated that the power consumption of the SoC is abnormal and the abnormal type of the SoC is determined, when a value of the single key parameter of the SoC is not within a predetermined normal range (e.g., falling within an abnormal range).

For example, the number of times of the cell switching is determined as the abnormal key parameter, and the abnormal type of the SoC is determined as a first abnormal type, when the number of times of the cell switching is not within a predetermined normal range. As another example, the paging interval is determined as the abnormal key parameter, and the abnormal type of the SoC is determined as a second abnormal type, when the paging interval is not within a predetermined normal range.

In another example embodiment, it is indicated that the power consumption of the SoC is abnormal and the abnormal type of the SoC is determined, when values of all the key parameters included in the single key parameter set of the SoC are not within respective predetermined normal ranges (e.g. falling within respective abnormal ranges).

For example, the number of times of cell switching and the paging interval are determined as the abnormal key parameters, and the abnormal type of the SoC is determined as a third abnormal type, when the number of times of cell switching is not within a first predetermined normal range and the paging interval is not within a second predetermined normal range. For example, the number of times of cell switching and the paging interval are determined as the abnormal key parameters, and the abnormal type of the SoC is determined as a fourth abnormal type, when the number of times of cell switching is not within a third predetermined normal range and the paging interval is not within the second predetermined normal range. For example, the number of times of cell switching and the paging interval are determined as the abnormal key parameters, and the abnormal type of the SoC is determined as a fifth abnormal type, when the number of times of cell switching is not within the third predetermined normal range and the paging interval is not within a fifth predetermined normal range.

In an example embodiment, the processor 110 may determine the key parameters, falling within respective abnormal ranges for a predetermined time or a predetermined number of times, among the plurality of key parameters as the abnormal key parameters.

For example, the number of times of cell switching is determined as the abnormal key parameter, when the number of times of cell switching is not within a predetermined normal range for a predetermined time, and the paging interval is determined as the abnormal key parameter, when the paging interval is not within a predetermined normal range for a predetermined number of times.

In an example embodiment, data related to determining the abnormal type of the SoC (e.g., key parameters, abnormal determination conditions, a predetermined duration, a predetermined number of times, etc.) may be stored in the memory 120. For example, data related to determining the abnormal type of the SoC may be stored in a predetermined mapping table. In the case that all of the key parameters are not within the respective abnormal range (e.g., falling within respective normal ranges), the processor 110 may determine that there is no abnormality in power consumption of SoC. In other words, it may be determined that there is no abnormal power consumption of the SoC.

In an example embodiment, the processor 110 may monitor and collect each of parameters of the parameter set included in a default profile that is called to form a log, when it is determined that there is no abnormality in power consumption of SoC (e.g., no abnormal type is detected). In this case, a number of types of parameters included in the log is large.

In another example embodiment, the SoC power consumption analysis system 100 may terminate the operation of the SoC power consumption analysis when no abnormal type is detected.

The processor 110 may determine hardware module(s) and/or software module(s) that cause the abnormal power consumption of the SoC based on the detected abnormal type, after detecting the abnormal type of the SoC. For example, the processor 110 may determine the hardware module(s) and/or software module(s) corresponding to the detected abnormal type based on a mapping table of the abnormal types and the hardware modules and/or software modules. The determined hardware module(s) and/or software module(s) may be considered to cause abnormal power consumption of the SoC.

Referring to FIGS. 1 and 2, the processor 110 may call a profile corresponding to the detected abnormal type among a plurality of profiles (e.g., profile #1, profile #2, . . . profile #N), after detecting the abnormal type of the SoC (S203).

In an example embodiment, the profile may be preset to include a plurality of parameter sets. The parameter sets of the profiles are different for different abnormal types. Therefore, the profiles are different for different abnormal types.

If there are more parameters in a parameter set of the profile, a number of types of parameters included in the log collected using the profile is larger, which is beneficial to analyze the abnormality. However, when collecting and analyzing the log, additional power is consumed and that will have an influence on the parameters and be reflected in the log, thereby affecting the accuracy of the analysis. If there are fewer parameters in a parameter set of the profile, the number of the types of the parameters included in the log collected using the profile is smaller, and although it may make the abnormality difficult to analyze, but the additional power consumption generated when collecting and analyzing the log is smaller than when there are more types of parameters included in the log.

According to embodiments of the present disclosure, the number and type of parameters included in the profile corresponding to the detected abnormal type called by the processor 110 correspond to the abnormal type of the SoC. This way, the log collected using the profile is more beneficial to the power consumption analysis of the SoC.

In an example embodiment, the SoC power consumption analysis system 100 presets a plurality of log profiles (e.g., N profiles, where N is an integer greater than 1) that may be flexibly called during operation depending on the abnormal type, to minimize power consumption and satisfy the purpose of analyzing the abnormality. For example, the processor 110 may call a profile (e.g., profile #1) corresponding to the detected abnormal type among the N profiles (e.g., profile #1 to profile #N), after detecting the abnormal type of the SoC.

In an example embodiment, the mapping relationship between the abnormal types of the SoC and the profiles may be stored in the memory 120.

Referring to FIGS. 1 and 2, the processor 110 may monitor and collect each of parameters in the parameter set included in the called profile to form the log, after calling the profile corresponding to the detected abnormal type among the plurality of profiles (S204).

The parameter set included in the profile is formed based on the determined abnormal key parameters. The parameter set included in each of the profiles includes at least one parameter group, and each of the at least one parameter group includes at least one parameter (for example, a level).

In an example embodiment, examples of the parameter group may include at least one of Platform Abstraction Layer (PAL), Non Access Stratum (NAS), NAS User Plane (NASU), Mobile Terminal Interface (NASU_MTI), Global Mobility Control (GMC), Public Land Mobile Network (PLMN), RRC, and Digital Signal Processing (DSP), and examples of the parameter group are not limited thereto.

In an example embodiment, examples of the level may include at least one of normal messages, warning messages, abnormal messages, and error messages, and examples of the levels are not limited thereto. In another example embodiment, examples of the level may include traceflow, tracemodule, dumpalert, dumpwarning, and the like.

If a single fixed profile is used to collect and store the log of the SoC, a number of types of parameters included in the log collected directly is large, which may lead to a large number of useless log information in the collected logs. In this case, the log validity is low. In addition, collecting a large number of log information and analyzing the information may result in additional power consumption, thus affecting the analysis of SoC's own power consumption.

According to embodiments of the present disclosure, the corresponding log profile is dynamically selected according to the abnormal type of the SoC, which not only ensures that the captured log may meet the analysis of the abnormality of the SoC, but also avoids increasing power consumption. Therefore, by purposefully capturing logs related to the power consumption problems (e.g., power consumption abnormalities) of SoC, the efficiency of abnormality analysis is improved, and the accuracy of power consumption-based analysis is improved by reducing additional power consumption of the SoC power consumption analysis system 100.

In an example embodiment, the collected log may be stored in the memory 120.

Referring to FIGS. 1 and 2, the processor 110 may perform a power consumption-based analysis on the SoC based on the log (S205), after monitoring and collecting each of parameters of the parameter set included in the called profile to form the log.

Specifically, the processor 110 may, based on the formed log, analyze the hardware module(s) and/or software module(s) determined based on the detected abnormal type that caused the abnormal power consumption of the SoC, thereby detecting an error in the determined hardware module(s) and/or software module(s).

In an example embodiment, the processor 110 may parse information (e.g., Event, UserID, Application, Category, etc.) required for power consumption analysis from the collected log, and detect errors in the determined hardware module(s) and/or software module(s) based on the parsed information.

According to some example embodiments, the processor 110 may, based on a predetermined algorithm, detect errors (such as, error types, error locations and the like) in the determined hardware modules and/or software modules based on the parsed information.

According to some example embodiments, the processor 110 may, based on a pre-trained error detection model, detect errors in the determined hardware module(s) and/or software module(s) based on the parsed information. For example, the error detection model may be trained using training data including information about various errors of the hardware modules and/or software modules and information of the corresponding log.

According to some example embodiments, the processor 110 may provide the parsed information and the determined hardware module(s) and/or software module(s) to a user for analysis and detection of errors in the hardware module(s) and/or software module(s).

Figure 3:
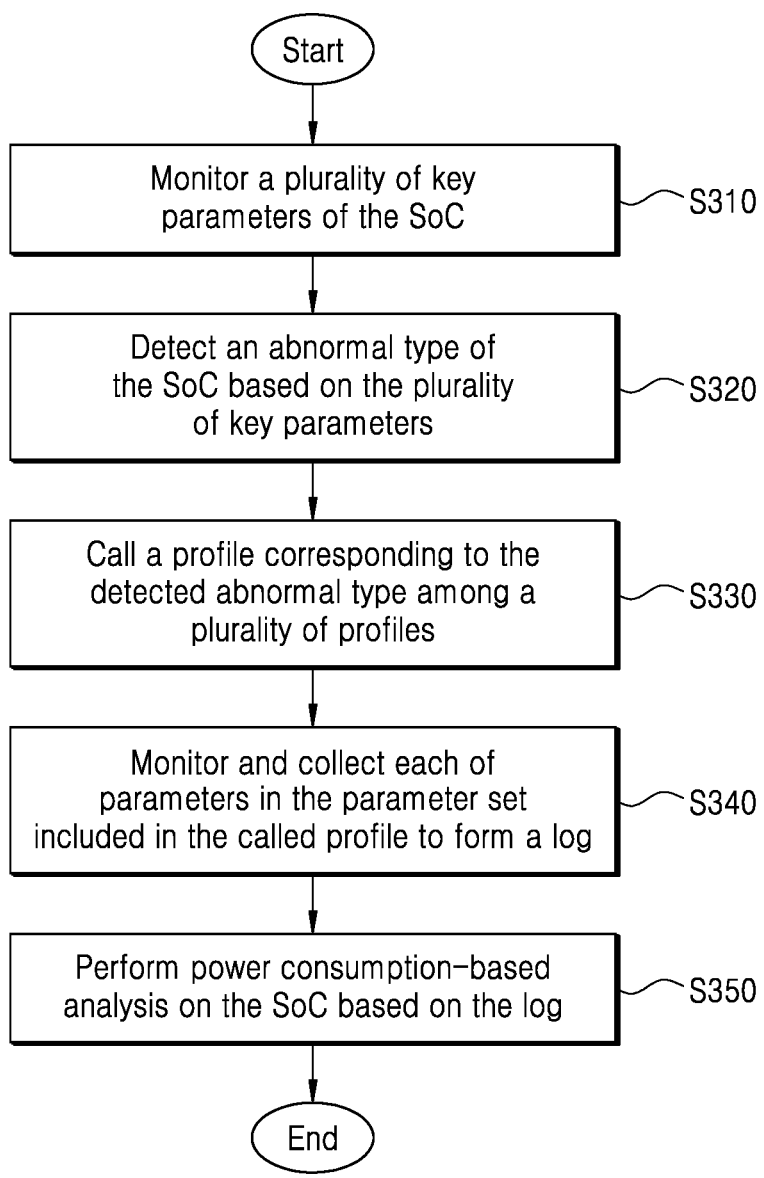
FIG. 3 is a flowchart illustrating a method for SoC power consumption analysis according to some example embodiments of the present disclosure.

FIG. 3 is a flowchart illustrating a method for the SoC power consumption analysis according to some example embodiments.

As shown in FIG. 3, in operation S310, the SoC power consumption analysis system 100 may monitor a plurality of key parameters of the SoC, wherein the plurality of key parameters are parameters related to the power consumption of the SoC.

In an example embodiment, the SoC power consumption analysis system 100 may monitor a plurality of key parameters at a predetermined frequency.

In operation S320, the SoC power consumption analysis system 100 may detect an abnormal type of the SoC based on the plurality of key parameters.

The abnormal type of the SoC may be a type of abnormality that occurs, wherein the abnormality is determined based on an abnormality of a single key parameter or an abnormality of a key parameter set including a plurality of key parameters. Here, each key parameter set may include two or more key parameters, and different key parameter sets may include different combinations of key parameters, or the same combination of key parameters with different abnormal judgment conditions (e.g., normal ranges and/or abnormal ranges). In this case, each abnormal type may correspond to a single key parameter or a single set of key parameters.

In an example embodiment, it is indicated that the power consumption of the SoC is abnormal and the abnormal type of the SoC is determined, when a value of the single key parameter of the SoC is not within a predetermined normal range.

In another example embodiment, it is indicated that the power consumption of the SoC is abnormal and the abnormal type of the SoC is determined, when values of all the key parameters included in the single key parameter set of the SoC are not within respective predetermined normal ranges.

In an example embodiment, the SoC power consumption analysis system 100 may determine the key parameters, falling within respective abnormal ranges for a predetermined time or a predetermined number of times, among the plurality of key parameters as the abnormal key parameters.

In an example embodiment, the SoC power consumption analysis system 100 may obtain the abnormal type corresponding to the key parameter set formed by the determined abnormal key parameters from a predetermined mapping table.

In an example embodiment, the SoC power consumption analysis system 100 may determine the hardware module(s) and/or software module(s) that cause the abnormal power consumption of the SoC based on the detected abnormal type for power consumption-based analysis on the SoC.

In the case that all of the key parameters are not within the respective abnormal range, it is determined that there is no abnormality in the power consumption of SoC, and the abnormal type of the SoC may be null (e.g., no abnormal type is detected).

In operation S330, the SoC power consumption analysis system 100 may call a profile corresponding to the detected abnormal type among a plurality of profiles.

The parameter set included in each of the profiles may include at least one parameter group, and each of the at least one parameter group may include at least one parameter. Different abnormal types may correspond to different profiles. The SoC power consumption analysis system 100 may call the profile corresponding to the detected abnormal type among a plurality of profiles based on parameters specific to each abnormal type.

In operation S340, the SoC power consumption analysis system 100 may monitor and collect each of parameters in the parameter set included in the called profile to form a log.

The SoC power consumption analysis system 100 may monitor and collect each of parameters in the parameter set included in the called profile to form the log when the abnormal type is detected.

In an example embodiment, the SoC power consumption analysis system 100 may monitor and collect each of parameters of the parameter set included in a default profile that is called to form the log, when no abnormal type is detected. In this case, the collected log may be a log that has not been intelligently filtered, so a number of types of parameters included in the collected log is large. In another example embodiment, the SoC power consumption analysis system 100 may terminate the operation of the SoC power consumption analysis when no abnormal type is detected.

In operation S350, the SoC power consumption analysis system 100 may perform power consumption-based analysis on the SoC based on the log.

The SoC power consumption analysis system 100 may determine hardware module(s) and/or software module(s) that cause an abnormality in power consumption of the SoC based on the detected abnormal type, after detecting the abnormal type of the SoC. For example, the SoC power consumption analysis system 100 may determine the hardware module(s) and/or software module(s) corresponding to the detected abnormal type based on a mapping table of the abnormal type and the hardware modules and/or software modules. The determined hardware module(s) and/or software module(s) may be considered to cause the abnormal power consumption of the SoC.

The SoC power consumption analysis system 100 may, based on the formed log, analyze the hardware module(s) and/or software module(s) determined based on the detected abnormal type that cause the abnormality in power consumption of the SoC, thereby detecting an error in the determined hardware module(s) and/or software module(s).

In an example embodiment, the SoC power consumption analysis system 100 may parse information (e.g., Event, UserID, Application, Category, etc.) required for power consumption analysis from the collected log, and detect errors in the determined hardware module(s) and/or software module(s) based on the parsed information.

In an example embodiment, the SoC power consumption analysis system 100 may, based on a predetermined algorithm, detect errors (such as, error types, error locations and the like) in the determined hardware module(s) and/or software module(s) based on the parsed information.

In an example embodiment, the SoC power consumption analysis system 100 may, based on a pre-trained error detection model, detect errors in the determined hardware module(s) and/or software module(s) based on the parsed information. For example, the error detection model may be trained using training data including information about various errors of the hardware modules and/or software modules and information of the corresponding log.

In an example embodiment, the SoC power consumption analysis system 100 may provide the parsed information and the determined hardware module(s) and/or software module(s) to a user for analysis and detection of errors in the hardware module(s) and/or software module(s).

Figure 4:
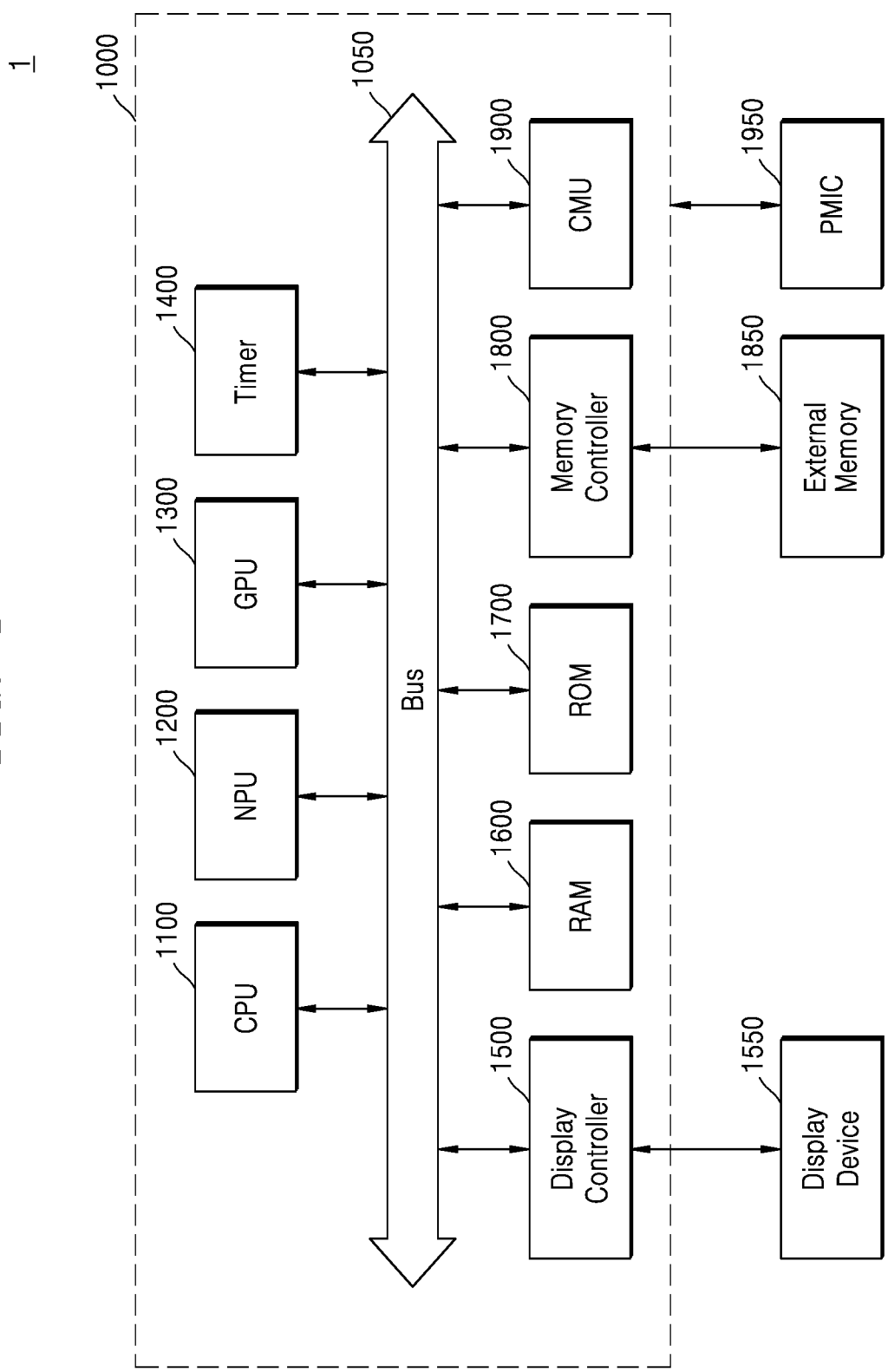
FIG. 4 is a block diagram illustrating an electronic device according to some example embodiments of the present disclosure.

FIG. 4 is a block diagram illustrating an electronic device according to some example embodiments.

Referring to FIG. 4, an electronic device 1 may be implemented as a handheld device, such as a mobile phone, a smartphone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, or an e-book.

The electronic device 1 may include a SoC 1000, an external memory 1850, a display device 1550, and a power management integrated circuit (PMIC) 1950.

The SoC 1000 may include a central processing unit (CPU) 1100, a neural processing unit (NPU) 1200, a graphics processing unit (GPU) 1300, a timer 1400, a display controller 1500, random access memory (RAM) 1600, read only memory (ROM) 1700, a memory controller 1800, a clock management unit (CMU) 1900, and a bus 1050. In example embodiments, the SoC 1000 may further include components other than the components shown. The PMIC 1950 may be implemented outside the SoC 1000. However, the SoC 1000 is not limited thereto, and the SoC 1000 may include a power management unit (PMU) capable of performing a function of the PMIC 1950. The CPU 1100 in the SoC 1000 of FIG. 4 may correspond to the processor 110 in the SoC power consumption analysis system 100 described above with reference to FIGS. 1-3, and the RAM 1600 and/or the ROM 1700 in the SoC 1000 of FIG. 4 may correspond to the memory 120 in the SoC power consumption analysis system 100 described above with reference to FIGS. 1-3. The SoC 1000 may perform operations similar to the SoC power consumption analysis system 100 described above with reference to FIGS. 1-3. The SoC 1000 may include the SoC power consumption analysis system 100 described above with reference to FIGS. 1-3.

The CPU 1100 may also be referred to as a processor, and may process or execute programs and/or data stored in the external memory 1850. For example, the CPU 1100 may process or execute programs and/or data in response to an operating clock signal output from the CMU 1900.

The CPU 1100 may be implemented as a multi-core processor. The multi-core processor is a computing component with two or more independent practical processors (called cores), each of which may read and execute program instructions. Programs and/or data stored in the ROM 1700, the RAM 1600, and/or the external memory 1850 may be loaded into a memory of the CPU 1100 as necessary.

The NPU 1200 may efficiently process large-scale operations using an artificial neural network. The NPU 1200 may perform deep learning by supporting multiple simultaneous matrix operations.

The GPU 1300 may convert data read from the external memory 1850 by the memory controller 1800 into a signal suitable for the display device 1550.

The timer 1400 may output a count value indicating a time based on the operating clock signal output from the CMU 1900.

The display device 1550 may display image signals output from the display controller 1500. For example, the display device 1550 may be implemented as a liquid crystal display (LCD), a light emitting diode (LED) display, an organic LED (OLED) display, an active-matrix OLED (AMOLED) display, or a flexible display. The display controller 1500 may control the operation of the display device 1550.

The RAM 1600 may temporarily store programs, data, and/or instructions. For example, programs and/or data stored in the memory may be temporarily stored in the RAM 1600 under the control of the CPU 1100 or the boot-code stored in the ROM 1700. The RAM 1600 may be implemented as dynamic RAM (DRAM) or static RAM (SRAM).

The ROM 1700 may store permanent programs and/or data. The ROM 1700 may be implemented as erasable programmable read-only memory (EPROM) or electrically erasable programmable read-only memory (EEPROM).

The memory controller 1800 may communicate with the external memory 1850 through an interface. The memory controller 1800 controls overall operations of the external memory 1850, and controls data exchange between the host and the external memory 1850. For example, the memory controller 1800 may write data to the external memory 1850 or read data from the external memory 1850 according to a request from the host. Here, the host may be a master device, such as the CPU 1100, the GPU 1300, or the display controller 1500.

The external memory 1850 is a storage medium for storing data and may store an operating system (OS), various programs, and/or various types of data. The external memory 1850 may be a nonvolatile memory device (e.g., flash memory, phase change RAM (PRAM), magnetic RAM (MRAM), resistive RAM (RRAM), or an FeRAM device, but is not limited thereto. In another embodiment, the external memory 1850 may be provided inside the SoC 1000. In addition, the external memory 1850 may be flash memory, an embedded multimedia card (eMMC), or a universal flash storage (UFS).

The CMU 1900 generates an operating clock signal. The CMU 1900 may include a clock signal generation device, such as a phase locked loop (PLL), a delayed locked loop (DLL), or a crystal oscillator.

The operating clock signal may be supplied to the GPU 1300. The operating clock signal may also be supplied to other components (e.g., the CPU 1100 or the memory controller 1800). The CMU 1900 may change the frequency of the operating clock signal.

The CPU 1100, the NPU 1200, the GPU 1300, the timer 1400, the display controller 1500, the RAM 1600, the ROM 1700, the memory controller 1800, and the CMU 1900 may communicate with each other via the bus 1050.

Figure 5:
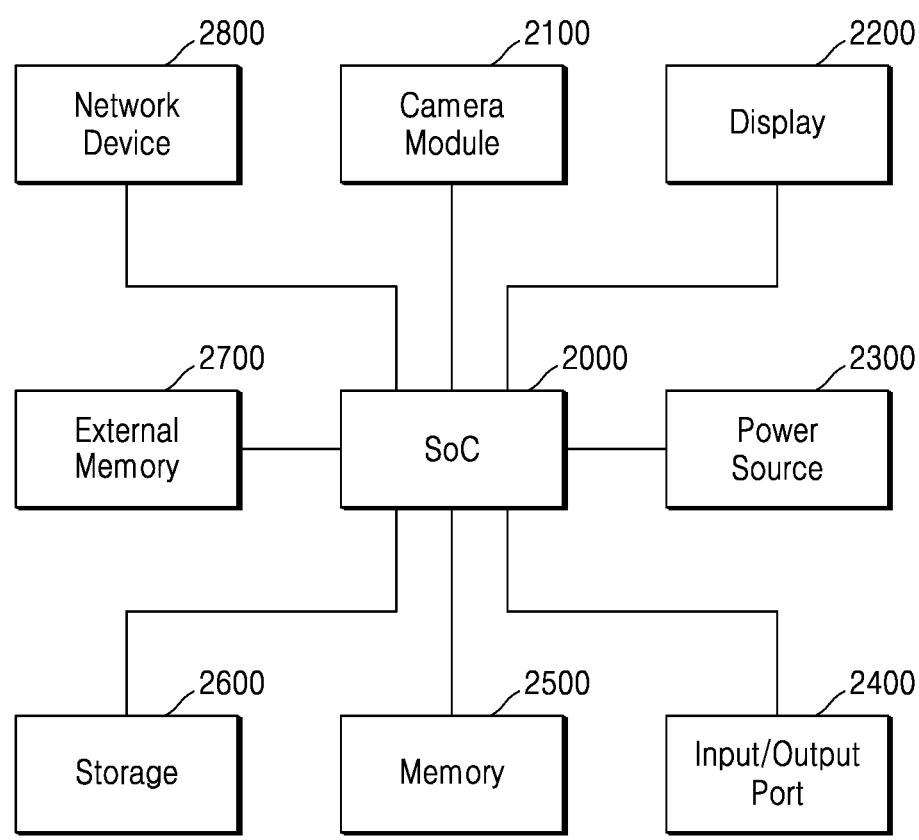
FIG. 5 is a block diagram illustrating an electronic device according to some example embodiments of the present disclosure.

FIG. 5 is a block diagram illustrating an electronic device according to some example embodiments.

Referring to FIG. 5, an electronic device 2 may be implemented as a personal computer (PC), a data server, or a portable electronic device.

The electronic device 2 may include a SoC 2000, a camera module 2100, a display 2200, a power source 2300, an input/output (I/O) port 2400, a memory 2500, a storage 2600, an external memory 2700, and a network device 2800. The SoC 2000 may perform operations similar to the SoC power consumption analysis system 100 described above with reference to FIGS. 1-3. The SoC 2000 may include the SoC power consumption analysis system 100 described above with reference to FIGS. 1-3.

The camera module 2100 refers to a module capable of converting an optical image into an electrical image. Accordingly, the electrical image output from the camera module 2100 may be stored in the storage 2600, the memory 2500, or the external memory 2700. In addition, the electrical image output from the camera module 2100 may be displayed on the display 2200.

The display 2200 may display data output from the storage 2600, the memory 2500, the input/output port 2400, the external memory 2700, or the network device 2800.

The power source 2300 may supply an operating voltage to at least one of the components of the electronic device 2. The power source 2300 may be controlled by the PMIC 1950 illustrated in FIG. 4.

The input/output port 2400 refers to a port capable of transmitting data to the electronic device 2 or transmitting data output from the electronic device 2 to an external device. For example, the input/output port 2400 may be a port for connecting a pointing device, such as a computer mouse, a port for connecting a printer, or a port for connecting a USB drive.

The memory 2500 may be implemented as a volatile memory or a nonvolatile memory. According to an embodiment, a memory controller capable of controlling a data access operation for the memory 2500, for example, a read operation, a write operation (or a program operation), or an erase operation, may be integrated or embedded in the SoC 2000. According to another embodiment, the memory controller may be implemented between the SoC 2000 and the memory 2500.

The storage 2600 may be implemented as a hard disk drive or a solid state drive (SSD).

The external memory 2700 may be implemented as a secure digital (SD) card or a multimedia card (MMC). According to an embodiment, the external memory 2700 may be a subscriber identity module (SIM) card or a universal subscriber identity module (USIM) card.

The network device 2800 is a device capable of connecting the electronic device 2 to a wired network or a wireless network.

According to some example embodiments, operations described herein as being performed by the SoC power consumption analysis system 100, the processor 110 and/or other components may be performed by processing circuitry.

The term "processing circuitry" used in this disclosure may mean, for example, hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System on Chip (SoC), a programmable logic unit, a microprocessor, application-specific integrated circuit (ASIC), etc.

The apparatuses, units, modules, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RW, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer may execute the instructions.

Although some example embodiments have been described, it should be understood by those skilled in the art that various changes in form and details may be made thereto without departing from the spirit and scope of the present disclosure as set forth by the claims.

What is claimed is:

1. A method for a system on chip (SoC) power consumption analysis, the method comprising:

monitoring, by a processor embedded in the SoC, a plurality of key parameters of the SoC, wherein the plurality of key parameters are related to power consumption of the SoC;

detecting, by the processor, an abnormal type of the SoC based on the plurality of key parameters;

calling, automatically in response to the detecting of the abnormal type of the SoC and by the processor from a memory embedded in the SoC, a profile corresponding to the detected abnormal type among a plurality of profiles stored in the memory, wherein each respective profile in the plurality of profiles includes a corresponding parameter set tailored to a respective abnormal type in a plurality of abnormal types of the SoC and has no executable analysis instructions to avoid increasing power assumption of the SoC;

monitoring and collecting, by the processor, each of parameters in the parameter set included in the called profile to form a log; and performing, by the processor, power consumption-based analysis on the SoC based on the log.

2. The method of claim 1, further comprising: determining a hardware module and/or a software module that causes abnormal power consumption of the SoC based on the detected abnormal type, and wherein the performing power consumption-based analysis on the SoC based on the log comprises detecting an error in the determined hardware module and/or software module by using the log.

3. The method of claim 1, wherein, each of parameters in the parameter set included in the called profile is monitored and collected to form the log when the abnormal type is detected.

4. The method of claim 1, wherein the detecting the abnormal type of the SoC comprises:

determining key parameters falling within respective abnormal ranges among the plurality of key parameters as abnormal key parameters; and acquiring the abnormal type of the SoC based on the abnormal key parameters.

5. The method of claim 4, wherein the determining key parameters falling within respective abnormal ranges among the plurality of key parameters as the abnormal key parameters comprises:

determining key parameters falling within respective abnormal ranges for a predetermined time or a predetermined number of times among the plurality of key parameters as the abnormal key parameters.

6. The method of claim 4, wherein the acquiring the abnormal type of the SoC comprises:

acquiring the abnormal type of the SoC corresponding to the parameter set formed by the determined abnormal key parameters from a predetermined mapping table.

7. The method of claim 1, wherein a parameter set included in each of the profiles comprises at least one parameter group, and each of the at least one parameter group comprises at least one parameter.

8. The method of claim 1, wherein different abnormal types correspond to different profiles.

9. The method of claim 1, further comprising: monitoring and collecting each of parameters in a parameter set included in a default profile that is called to form the log when no abnormal type is detected.

10. The method of claim 1, wherein the plurality of key parameters comprise at least two of channel information, memory interface information, cell handover information, radio access registration information, Shannon Interface for Telephony (SIT) message information, and SoC sleep information.

11. The method of claim 10, wherein the channel information comprises at least one of application data, log data, nonvolatile data and interface control data;

the memory interface information comprises at least one of a number of times and a duration of the memory interface connection;

the cell handover information comprises at least one of a number of times of cell switching, a number of times and a duration of radio resource control setup;

the radio access registration information comprises at least one of a number of times of radio access switching and a change in the registration status;

the SIT message information comprises a number of SIT messages, and the SIT messages contain a request and indication message between an application processor and a communication processor; and the SoC sleep information comprises at least one of a paging interval, on time and off time of the SoC when radio resource control is connected.

12. A non-transitory computer-readable storage medium storing instructions that, when executed by a processor, cause the processor to execute the method of claim 1.

13. A system for a system on chip (SoC) power consumption analysis, the system comprising:

a processor embedded in the SoC and configured to:

monitoring a plurality of key parameters of the SoC, wherein the plurality of key parameters are related to the power consumption of the SoC;

detecting an abnormal type of the SoC based on the plurality of key parameters;

calling, automatically in response to the detecting of the abnormal type of the SoC and from a memory embedded in the SoC, a profile corresponding to the detected abnormal type among a plurality of profiles stored in the memory, wherein each respective profile in the plurality of profiles includes a corresponding parameter set tailored to a respective abnormal type in a plurality of abnormal types of the SoC and has no executable analysis instructions to avoid increasing power assumption of the SoC;

monitoring and collecting each of parameters in the parameter set included in the called profile to form a log; and performing power consumption-based analysis on the SoC based on the log.

14. The system of claim 13, wherein the processor is further configured to: determine a hardware module and/or a software module that causes abnormal power consumption of the SoC based on the detected abnormal type, and detect an error in the determined hardware module and/or software module by using the log.

15. The system of claim 13, wherein, the processor is further configured to: monitor and collect each of parameters in the parameter set included in the called profile to form the log when the abnormal type is detected.

16. The system of claim 13, wherein the detecting the abnormal type of the SoC comprises:

determining key parameters falling within respective abnormal ranges among the plurality of key parameters as abnormal key parameters; and acquiring the abnormal type of the SoC based on the abnormal key parameters.

17. The system of claim 16, wherein the determining key parameters falling within respective abnormal ranges among the plurality of key parameters as the abnormal key parameters comprises:

determining key parameters falling within respective abnormal ranges for a predetermined time or a predetermined number of times among the plurality of key parameters as the abnormal key parameters.

18. The system of claim 16, wherein the acquiring the abnormal type of the SoC comprises:

acquiring the abnormal type of the SoC corresponding to the parameter set formed by the determined abnormal key parameters from a predetermined mapping table.

19. The system of claim 13, wherein the parameter set included in each of the profiles comprises at least one parameter group, and each of the at least one parameter group comprises at least one parameter.

20. The system of claim 13, wherein different abnormal types correspond to different profiles.

\* \* \* \* \*